United States Patent
Oepen

[15] 3,664,061
[45] May 23, 1972

[54] METHOD OF AND APPARATUS FOR THE DEVELOPMENT OF PLANT GROWTH

[72] Inventor: Karl Oepen, Gladbscherstrasse 28, 5 Koln, Germany

[22] Filed: Mar. 3, 1971

[21] Appl. No.: 120,404

Related U.S. Application Data

[63] Continuation-in-part of Ser. No. 705,747, Feb. 15, 1968, abandoned.

[52] U.S. Cl. ................................................47/1.2
[51] Int. Cl. ................................................A01g 31/00
[58] Field of Search ..............................47/1.2, 17

[56] References Cited

UNITED STATES PATENTS

| | | |
|---|---|---|
| 3,284,948 | 11/1966 | Kyle ................................47/1.2 |
| 3,300,896 | 1/1967 | Lunstroth ........................47/1.2 |
| 3,425,158 | 2/1969 | Kyle ................................47/1.2 |
| 3,432,965 | 3/1969 | Smith et al. ....................47/1.2 |

Primary Examiner—Robert E. Bagwill
Attorney—Holman & Stern

[57] ABSTRACT

A development of plant growth in which the seed material or the plants are supplied on an endless conveying means rotating in a horizontal plane to a plurality of successive treatment stations. The conveying means is constituted by a belt provided with a plurality of apertures and at the initiation of the growth, a seeding frame disposed on the belt limits the area of the seed material to be applied onto the belt. The frame or a portion thereof, is displaceable in such a fashion that upon movement of the belt by a length corresponding at least to the width of the frame, the seed material can be moved without difficulty by the frame to a position below the frame, together with the belt to the next treatment station.

9 Claims, 9 Drawing Figures

Patented May 23, 1972

Patented May 23, 1972  3,664,061

METHOD OF AND APPARATUS FOR THE DEVELOPMENT OF PLANT GROWTH

This application is a continuation-in-part of Ser. No. 705,747 filed Feb. 15, 1968, now abandoned.

BACKGROUND OF THE INVENTION

The present invention relates to a method of and apparatus for the development of plant growth in which the seed material or the plants are supplied or furnished onto an endless conveyor rotatable in a horizontal plane to a series of successive treatment stations or zones.

In a known apparatus, the seed material is filled into seed boxes and in such boxes travel to the treatment stations which accelerate the growth thereof. The guiding of the seed boxes on a conveying means rotatable in vertical planes is known and in the lower region or area of such conveying movement, the same, together with the boxes are immersed in a nutrient solution and exposed to light sources and heat during the further path of movement. Also, it is a known practice to guide the seed material in the seed boxes in a substantially horizontal plane and during the course of movement in such plane to immerse the same in spaced nutrient solutions with artificial lighting being effected between the times of immersion. In a further development of this concept, it has been proposed to design the seed boxes as closed boxes and to provide different atmospheric conditions within such boxes.

This invention proceeds from the concept of providing an apparatus for developing plant growth which allows the attainment of maximum efficiency with very small requirements for space and little expense for the provision of the required structural components.

SUMMARY OF THE INVENTION

In order to solve the problem, the applicant proposes in an apparatus for developing plant growth in which the seed material or the plants are supplied or furnished onto an endless conveyor movable in a horizontal plane to a series of successive treatment stations, that the conveyor be defined by a belt provided with a plurality of apertures and that at the beginning of the growth, there is disposed on the belt a feeding frame limiting the area of the seed material to be applied to the belt with the seeding frame or a portion thereof being displaceable in such a fashion that during the movement of the belt by a length corresponding at least to the width of the frame, the seed material is movable without impediment by the frame, below the latter, together with the belt to the next station for treatment. By virtue of this concept, there is achieved the advantage that seed boxes which carry the seed material during the treatment in the individual sections are eliminated.

The above in the first place means that a considerable simplification of the apparatus is possible and the belt may be constituted of a variety of materials. Preferably, a belt of rubber or plastic provided with a plurality of apertures is employed but a fabric belt or belt of steel gauze may be utilized. The apertures in the belt and whose function is to allow the liquid and particularly the nutrient liquid emanating from sprinkling sources disposed above the individual treatment stations to pass therethrough, are of such dimensions as to prevent the seed material from falling through the belt.

It is further proposed to provide a type of seed box which is employed only at the beginning of the growth with the box being defined by a frame in which the seed material can be distributed over the required area. Within the frame and for the duration of treatment of the seed material within such frame which, generally speaking is one day, the seedlings become interlaced and intertwined so that a plurality of seed grains form a cohesive unit sufficient to withstand transportation to the next station of treatment without the grains moving apart so that the area on which they are arranged changes or substantially changes. The interlacing of the seed grains within the frame during treatment in the first treatment station can be accelerated by effecting a higher dose of nutrient solution or a higher concentration of nutrient solution in connection with more intensive radiation during treatment in the first station thereby providing growth conditions in such station which are stronger in their action than in the subsequent treatment stations. Hence, in the first treatment station there is effected an over-feeding of the seed with energy for the promotion of growth for accelerating root formation. This concentrated dose does need not be effected in the next following treatment stations, since in the long run this would constitute an overtaxing of the growth capacity.

In order to dispense with seed boxes, according to the invention, the seed grains are pre-germinated prior to their introduction into the seeding frame.

It is also proposed that one or more deflecting rolls of the belt present numerous apertures on their generated surface and within the roll, an air or water feed pipe is provided whereby nozzles or guide surfaces direct the air or water radially outwardly in the direction of the discharge of the plants from the belt. By virtue of this arrangement, any foreign matter which may be present in the apertures in the belt, such as residues of seedling, are removed and this is particularly true if the rolls are provided on their generated surface with axially extending slot-type openings.

The foregoing means also assist the deflecting rolls in the removal of the grown plants from the conveyor belt and is improved by providing the belt at its longitudinal edges with an upper ledge and a lower projecting ledge whereby a gap is produced between the plant carrying portion of the belt and the deflecting rolls. In connection with the air or water jet supplied to the surface of the deflecting rolls, there results a pulsating movement of the belt which facilitates the detachment of the plants or the plant cake from the belt and by the distance realized by the thickened edges of the belt between the plant carrying portion thereof and the outer surface of the deflecting roll, a better accessibility of the air and water jets to the openings in the belt is attained. The air and water jets serve not only to assist in lifting the plants from the belt or to facilitate such lifting, but the water jets rinse away residues of nutrient solutions present on the plants. The rinsing of the residues of nutrient salts or the like is additionally effected to the sprinkling preferably with pure water in the last treatment station from the top.

In a further characteristic of the present invention there is provided at the discharge end of the belt deflected about the roll a guide plate which opens into a chute.

In order to fill the seeding frame, the present invention in a further aspect provides a seed material carriage movable on rails over the frame and equipped with a roll for the discharge of the seed material and the carriage is provided with a downwardly movable ledge for the uniform distribution of the material into the frame as the carriage is returned. For the movement of the carriage it is proposed that the carriage be first guided on vertically directed rail sections and deflected by suitable switching means onto rail sections above the seeding frame or to both sides of the seeding frame.

The invention further includes an embodiment in which a seed hopper having feed pipes which open above the seeding frame and related to each seeding frame a distributing plate is movable over the entire extent thereof. To deposit the seed material into the frame, a trough is provided with a worm conveyor in the bottom of the hopper and such conveyor is particularly efficacious if pre-germination occurs at the hopper or other conveying devices may be utilized, such as compressed air. In order to control the pre-germination of the seed material in the hopper and to be in a position for establishing the quantity of required pre-germinated material, in the region of the bottom end of the hopper overflows are provided at different levels for the liquid.

Further objects and advantages of the present invention will become more readily apparent to persons skilled in the art from the following detailed description and annexed drawings and in which drawings:

DETAILED DESCRIPTION OF THE INVENTION

Figure 1:
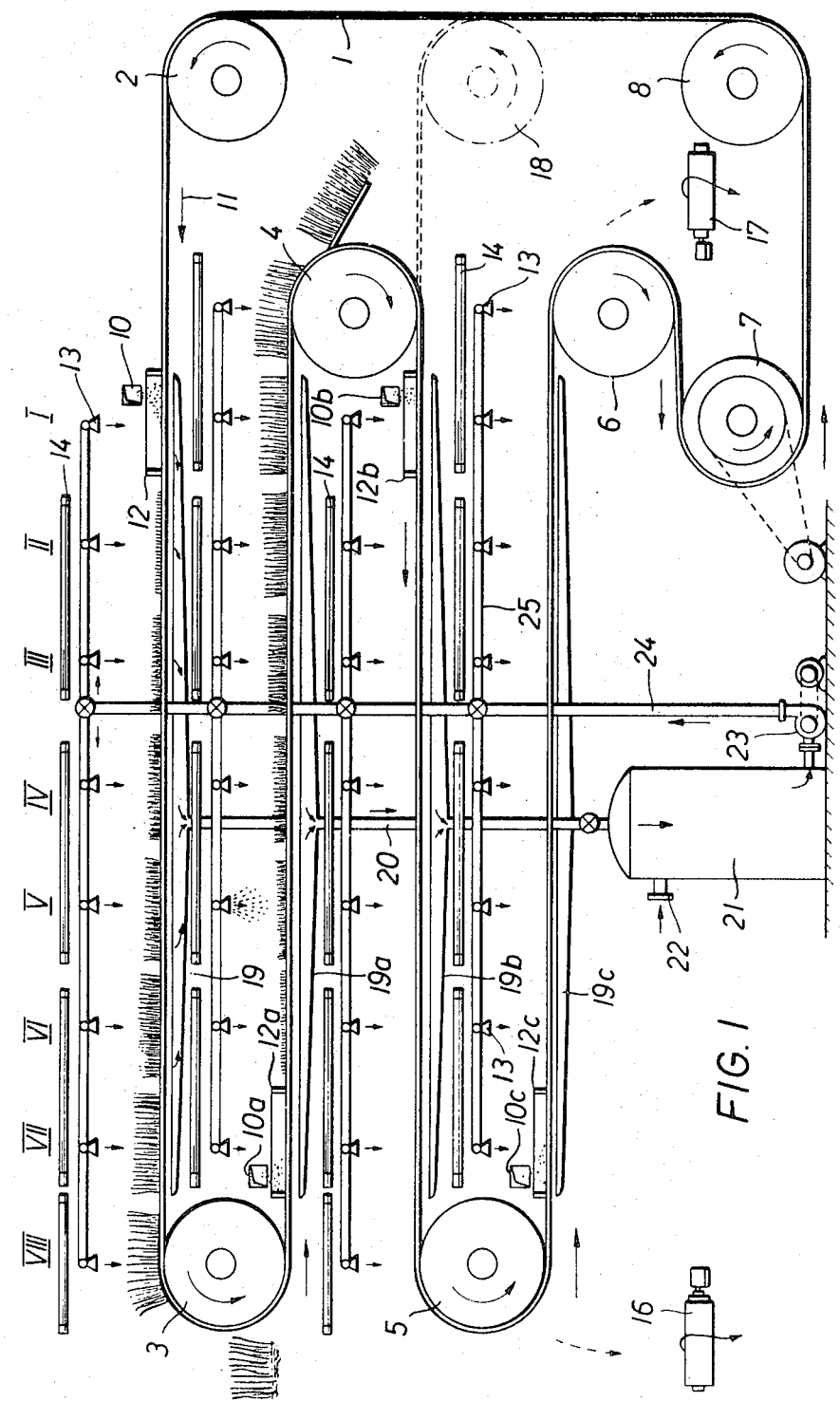
FIG. 1 is an elevational view of a preferred embodiment of the invention.

Referring to FIG. 1, it will be seen that a conveyor belt 1 is passed or trained over a plurality of deflecting rolls 2–7 in such a fashion that there are a plurality of growth flights with both the top surface and under surface of the belt being utilized as growth areas. At the same time, by the deflection of the belt at the ends of the growth flight, the discharge or removal of the growth plants is effected.

On the upper horizontally extending flight, seed material 9 passes through a feed trough 10 onto the conveyor belt 1 which is moving in the direction indicated by arrow 11. The seed material enters a seeding frame 12 to be later described in more detail. The material remains in the frame 12 until the seed grains or seedlings etc., have formed roots and the roots become interlaced so that a more or less loosely coherent mat is produced. This action takes several hours and generally speaking, a days time.

To accelerate the growth in Treatment Station I within the frame 2 a nozzle 13 is arranged for supplying a nutrient solution to the seed grains, seedlings or the like. Moreover, a light source 14 is employed and preferably is constituted by a fluorescent tube which furnishes artificial illumination at subsequent Treatment Stations II and III. At Station I, the material is subjected to a special and intensively acting irradiation for accelerating root formation. After a sufficient root formation exists which interlaces the individual seed grains or otherwise holds the same together to provide a mat, the frame 12 is lifted or elevated by conventional means or manually and the belt moved in the direction of the arrow 11 until the seed grains or seedlings are located beneath the nozzle at Station II. In this position, the mat of seed grains or small plants again remain for a certain period of time, and as a rule one day, until with the next movement of the conveyor the same are guided to the Station III. This advance of the treatment stations occurs at long time intervals in an intermittant manner. At equally long time intervals, the introduction of seed grains into the seeding frame in its lowered position is effected.

As illustrated in FIG. 1, the deflecting rolls 2–7 are driven by an electric motor 15 operably connected to the deflecting roll 7. The belt 1 passes around the roll 7 to roll 8 and thence to roll 2. It will be readily appreciated that rolls 3 and 4, together with rolls 5 and 6 are offset at different levels while rolls 3 and 5, and 4 and 6 are located in the same vertical planes. As a consequence, the deflecting rolls will "cast off" the grown plants at the same time following the leaving of the last treatment station. It is further apparent that the top and under surface of the belt alternately are used as areas for the growth of the plant so that a substantial portion of the belt surfaces is utilized.

The plants discharge from the deflecting rolls 3 and 5 are deposited on a conveyor 16, while those from the rolls 4 and 6 are deposited onto a conveyor 17. The conveyors 16 and 17 are located at right angles to the direction of movement of the belt 1. It will be seen that the length of the belt and as a consequence of the growth areas is shortened in a simple manner. In addition, in lieu of the four growth flights illustrated in FIG. 1, these may be increased to six or eight growth flights without departing from the essentials above set forth.

Beneath each growth flight there is a correlated trough 19, 19a, 19b and 19c which open or communicate with a line 20 leading to a collecting vessel or container 21. The collecting vessel is provided in its upper area with an inlet connection 22 for fresh nutrient solution. In the lower zone of the vessel 21 there is provided a line communicating with a pump 23 for directing nutrient solution through conduit 24 to the various heads or nozzles 13. Valves 26–29 regulate the supply of the nutrient liquid. Also, the individual nozzles or heads 13 may be adjusted with respect to the quantity to be supplied thereby.

Lastly, it is possible that in the individual treatment stations I–III a different solution is supplied each time which takes into account the conditions of growth. In the last treatment station, pure water preferably is supplied for rinsing the existing residues of nutrient solutions from the plants.

Figure 2:
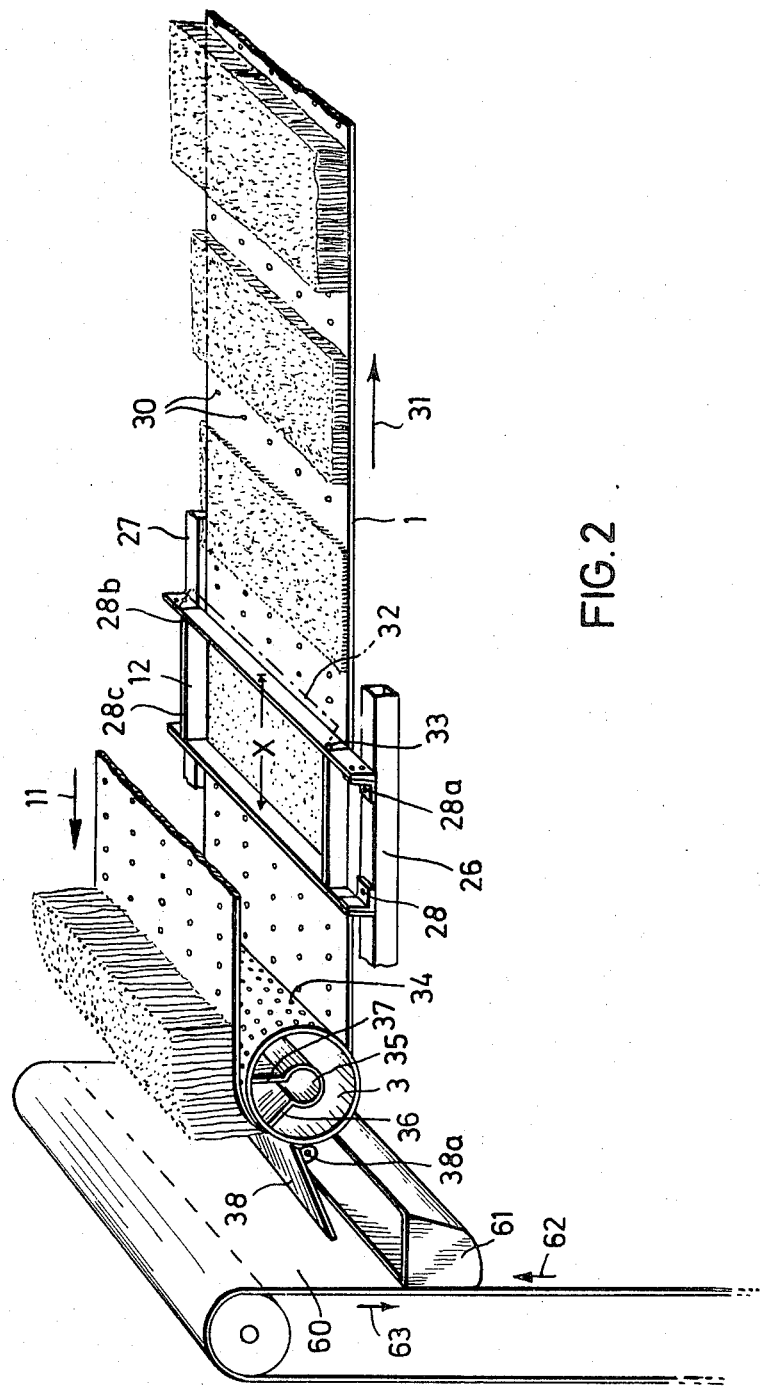
FIG. 2 is a view in perspective of a portion of the conveyor belt with a deflecting roll.

FIG. 2 illustrates clearly the movement of the belt 1 around the deflecting roll 3 and the belt is provided with a plurality of apertures 30. The belt moves in the direction of the arrow 11 and forward in the upper flight and is returned in the direction indicated by arrow 31. At the beginning of such return, the growth flight starts and it is at this area that the frame 12a is provided. The seed material 9 introduced into the frame is uniformly distributed on the belt 1 within the frame. After a length of time and as previously mentioned generally one day, the seed grains have formed roots of such size that the roots of adjacent grains become interlaced so that the grains form a mat. The frame 12a is provided with a wall portion 32 which is movable about a horizontal axis 33 located so that it is possible without lifting the entire frame with the continued movement of the belt in the direction of arrow 31 for the seed grains to pass out of the area of the frame 12a without being hindered thereby in their movement. The belt moves on a distance corresponding to width X of the frame 12a but by a certain additional amount in order that between the individual fields there is provided a gap or hiatus for preventing a coalescence of the fields during later growth thereby facilitating the detachment or removal of the plants from the belt. FIG. 2 is thought to clearly illustrate the advance in growth at the various growth stations II–III etc.

The present invention employs stationary seeding frames 12 or in other words, the frames 12 do not move together with the belt 1. In FIG. 2 it will be seen that the front and rear walls of the frame are extended beyond end walls 12' as indicated at 12" and such extensions are attached to horizontal supports or carriers 26 and 27 of the framework of the apparatus by means of angle irons 28 and screws 28a. It will be appreciated that the overall length of the frame is greater than the width of the belt 1 and since the ends of the frame are secured to the supports 26 and 27, the frame cannot move with the belt.

Figure 7:
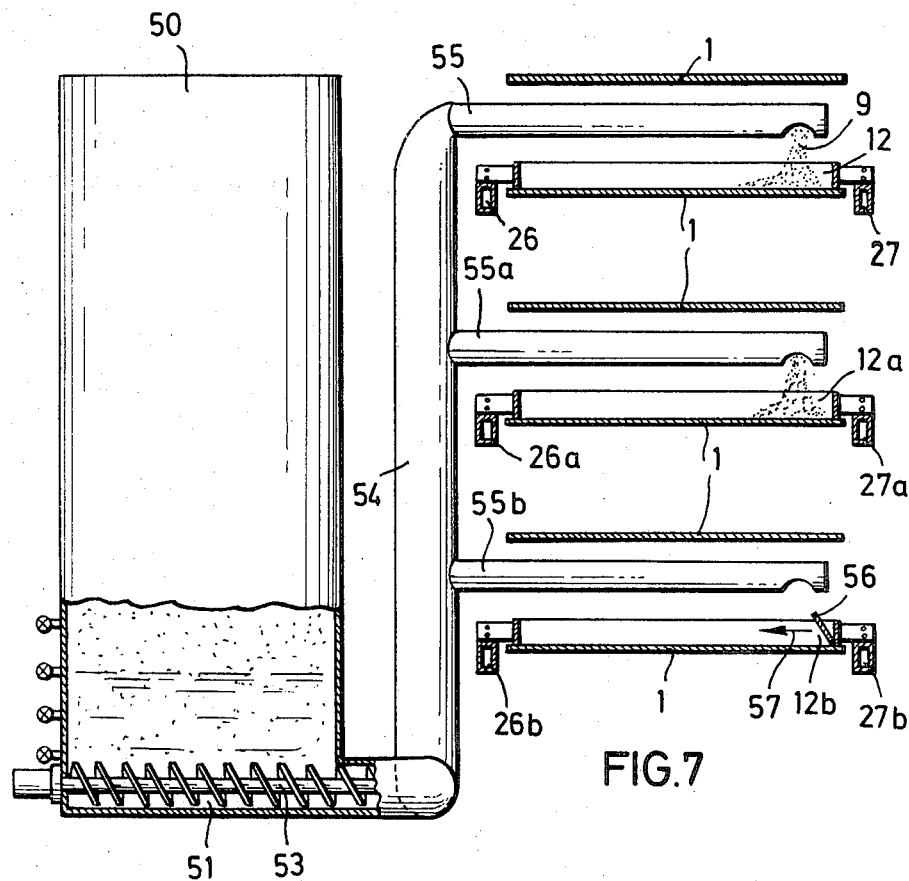
FIG. 7 is a view partly in elevation and partly in cross-section transverse to the direction of movement of the belt with the deflecting rolls not being illustrated.

FIG. 7 illustrates several seeding frames located one beneath another in horizontal positions and the manner in which the frames are attached to the horizontal supports or carriers of the framework.

The seeding frame 12 serves the purpose of forming growth mats which are spatially defined on the belt after filling with the seed material. After approximately 24 hours or one day following the filling of the frame 12 with seed material, a loose connected mat is formed from the germinated seedings. In view of the fact that the belt 1 moves over a path in the direction of the arrow 31 which is somewhat greater than the width X of the frame 12, growth mats are produced on the belt which are separated from one another, which do not grow together and are easily removed from the belt. During each continued movement of the belt, all seeding frames or their movable wall portions 32 are raised. Hence, only once a day, the wall portion 32 of each frame is moved upwardly or if the frame is not provided with a movable wall portion, the frame 12 per se is lifted slightly. The raising or lifting of the wall portion 32 or the frame per se can be effected via a common timer switch which turns, for example, a lifting cog at 24 hour intervals.

It will be seen that the roll 3 has a generated surface provided with a plurality of apertures 34 and a feed conduit 35 is located within the roll for supplying compressed air or water under pressure which only becomes effective when the belt is moved. The feed line 35 provides a nozzle-type slot associated with radially and sectorally guide faces 36 and 37 so that an air jet or water jet is directed toward that portion of the low periphery which assists the "casting off" of the plants primarily effected by deflection from the belt 1. The air or water jet causes a cleaning of the apertures in the conveyor belt and any seed grains with its roots clogging the openings will be washed away by the jet. The feed line 35 with the guide faces 36 and 37 are stationary, while the surface of the roll rotates preferably once during the period of a day. The jet-type slit between the guide faces 36 and 37 for air pressure and water pressure serves for removing the plants from the belt 1 at each return roll more easily as well as freeing the holes in the belt from particles blocking the holes. After the belt 1 is moved only once per day about the width of a treatment station, the completely grown plants also reach only once a day the removal point which is constituted by a guide plate 38. Accordingly, a time switch is utilized for opening once per day the valves for the air pressure and water pressure which are located in the feed line 35, that is to say at a time when the completely grown plants have arrived at the removal point, namely the guide plate 38.

As illustrated in FIG. 1, the plants which are discharged from the return rolls fall down to a conveyor 16 or 17. In order to better protect the plants, it will be seen in FIG. 2 that the plants are first positioned on the inclined guide plate 38 and are lowered by means of a bucket-type conveyor. A bucket 61 is carried by a belt 60 which is movable vertically. During the upward movement of the belt 6 as indicated by arrow 62, a switch is first actuated to lower the plate 38 downwardly about its pivot 38a, after which the plants slide from the guide plate into the bucket 61. After this phase, the belt 60 together with the filled bucket move downwardly in the direction of arrow 63 where the bucket is emptied carefully. In this fashion, the completely grown plants are transported in a downward direction once a day.

Figure 3:
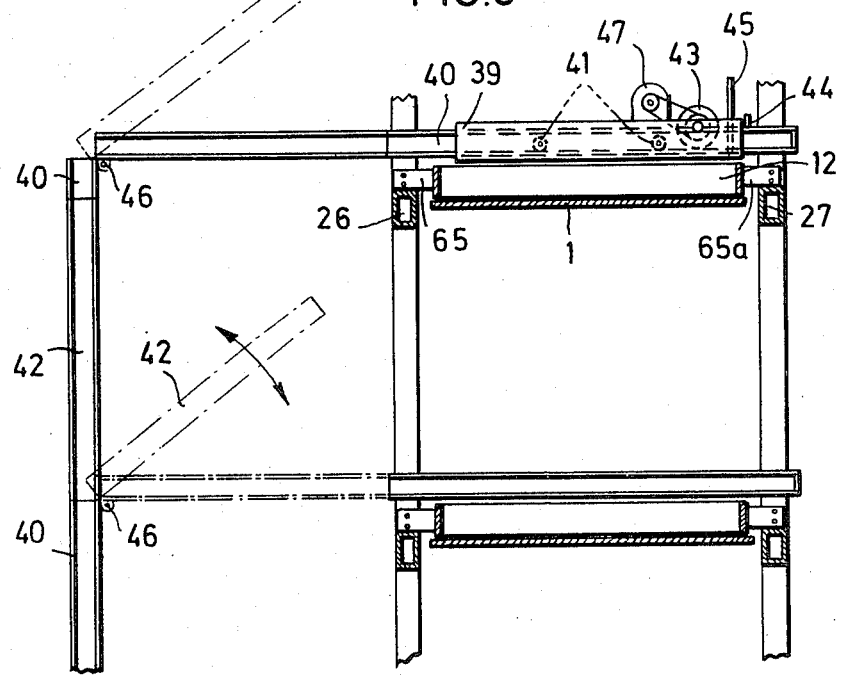
FIG. 3 is a view partly in elevation and partly in cross-section of a seed material carriage on rails for the filling of the seeding frame.

In FIG. 3, there is illustrated a carrier 39 for seed material which is movable along rails having a U-shaped profile and which is capable of filling a seeding frame 12. The frame 12 which is positioned closely over the belt 1 is attached by means of clips or the like 65 and 65a and screws to the horizontal supports or carriers 26 and 27 as previously described. The carrier 39 is powered by a small motor (not shown) and wheels 41 of the carrier cooperate with a toothed component, preferably a chain. The rails for the carrier include horizontal portions 40 fixed to the framework of the apparatus so as to overlie a seeding frame 12 and vertical portions provided with hinges or pivots 46 which enable the vertical portions to be swung from a vertical position to a horizontal position to provide a switch portion 42 which, in the horizontal position is in alignment with the portion 40.

Consequently, when the carrier 39 travelling from a lower part of the apparatus in a vertical direction is on the vertical portion between hinges 46, a contact is made whereby the switch 42 together with the carrier is swung 90° as indicated by the arrow so that the switch portion lines up with the horizontal portion 40. When the switch portion is in its horizontal position, the carrier 39 continues its movement over the seeding frame 12 until the carrier strikes an end contact 44 which reverses the driving motor so that the carrier starts its movement in the opposite direction. During this latter movement of the carrier, the frame 12 is filled with seed material by virtue of a discharge roller 43 driven by motor 47 and at the same time, a ledge 45 is moved downwardly for an even distribution of the grains of seed.

By virtue of this particular arrangement, the carrier 39 can be employed to fill a plurality of seeding frames carried by the framework above the flights of the belt.

Figure 4:
FIG. 4 is a vertical sectional view through a conveyor belt.

It will be noted that the conveyor belt 1 is provided with enlargements 48 at the edges thereof (FIG. 4) so that in the zone carrying the plants, the belt does not apply directly on the deflecting rolls 3–6. The enlarged areas are in the form of ledges which project over each side of the belt since, as previously mentioned, the belt is used alternately on the upper and under sides for enabling the space saving arrangement with a large growth area to be achieved (FIG. 1).

Figure 5:
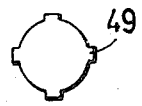
FIG. 5 is a view in radial section through a modified type of deflecting roll.
Figure 6:
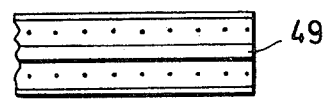
FIG. 6 is a view in side elevation of the roll shown in FIG. 5.

It is also possible to obtain a gap or hiatus between the deflecting roll and the conveyor belt 1 by providing the deflecting rolls with projecting ledges 49 which extend in the axial direction (FIGS. 5 and 6).

Figure 8:
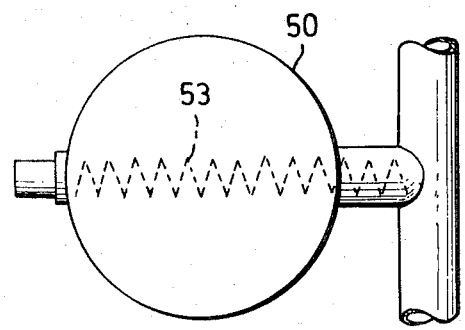
FIG. 8 is a top plan view of the hopper illustrated in FIG. 8.
Figure 9:
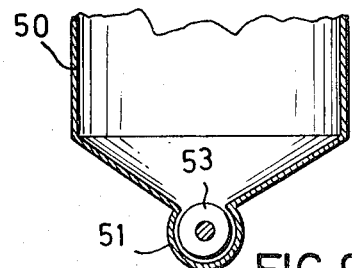
FIG. 9 is a fragmentary view partly in elevation and partly in cross-section of the roller zone of the hopper shown in FIG. 7 but offset by 90° with respect thereto.

As perhaps best shown in FIG. 7, there is provided a hopper 50 for the seed material. In the lower zone of the hopper there is provided a trough 51 in which is arranged an endless screw or worm 53 driven by an electric motor 52. The worm introduces the seed material via a central feed conduit or pipe 54 and distributing pipes 55, 55a and 55b into the seeding frames 12, 12a and 12b. It should be mentioned that in FIG. 7 the three seeding frames 12 are arranged one beneath the other, rather than as illustrated in FIG. 1. It will be further noted that seeding frame 12b is provided with a scraper 56 which, when moved in the direction indicated by arrow 57, effects a uniform distribution of the seed material. As believed readily apparent from FIG. 8, it will be noted that one hopper 50 is sufficient to also feed other seeding frames by means of a worm or endless conveyor in connection with pipes. The hopper 50 is also equipped with compartment pipes 58 in order to be able to adjust the height of the liquid level for the pre-germination of the seed material.

It will further be noted from FIG. 7 that the frames 12, 12a and 12a by being mounted on the carriers 26, 27, 26a, 27a and 26b, 27b, respectively cannot move with the moving belt 1.

The apparatus is provided with a frame (not shown) which can be dismantled for transportation.

What is claimed is:

1. Apparatus for developing plant growth comprising a framework, an endless conveyor, a plurality of rolls mounted on said framework and about which the conveyor passes for movement in a horizontal plane to a plurality of successive treatment stations, said conveyor being defined by a belt provided with a plurality of apertures, a seeding frame, means stationarily supporting said seeding frame on the framework to overlie the belt in proximity to the first treatment station for limiting the area of seed material to be applied to the belt, means for introducing seed material into the seeding frame, at least a portion of said seeding frame being movable upwardly with respect to the belt so that upon movement of the belt by a length corresponding at least to the width of the frame, the seed material can be moved without hindrance below the frame together with the belt to the next treatment station and drive means operably related to one of said rolls for driving said roll and imparting movement to the belt.

2. The apparatus for developing plant growth as claimed in claim 1 in which the size of said apertures in said belt is such as to prevent the seed material falling therethrough.

3. The apparatus for developing plant growth as claimed in claim 1, in which certain of said rolls have an outer surface provided with a plurality of holes therein, a fluid feed conduit located within each of said rolls having guide surfaces focusing a fluid jet radially outward and towards said belt as said belt passes over the roll for cleaning of the apertures of the belt as it passes over the roll, with such passage over the roll causing removal of the plants by gravity and fluid assistance.

4. The apparatus for developing plant growth as claimed in claim 3 in which each of said rolls is provided at its surface with outwardly projecting axially extending ledges, with said ledges serving to space the belt from the surface of the roll.

5. The apparatus for developing plant growth as claimed in claim 3 in which a guide plate is coextensive with the roll and immediately adjacent to the belt where the belt passes about the roll for guiding the plants to a conveyor.

6. The apparatus for developing plant growth as claimed in claim 1 in which said belt is provided along each of its longitudinal edges with an upper and a lower projecting component, with said edges serving to space a portion of the belt therebetween from the surface of the rolls.

7. The apparatus for developing plant growth as claimed in claim 1 wherein said seed supply means includes a carriage for seed material, rails supported by the framework above the seeding frame, the carriage being movable on said rails, vertical rails spaced outwardly of said supported rails, said vertical rails being provided with pivots to enable a vertical rail to be swung from a vertical position to a horizontal position to provide a switch portion in alignment with the rails supported above the seeding frame, a roll for the carriage for the discharge of the seed material and a downwardly movable ledge for the uniform distribution of the seed material, and an electric motor on the carriage for driving said discharge rolls.

8. The apparatus for developing plant growth as claimed in claim 1 including a hopper for seed material and feed pipes leading from the hopper to the seeding frame, and means in said hopper and feed pipes for moving the seed material.

9. The apparatus for developing plant growth as claimed in claim 8 in which the means in said hopper for moving the feed material includes a trough in the bottom of the hopper and a work conveyor disposed in the trough.

* * * * *

UNITED STATES PATENT OFFICE
CERTIFICATE OF CORRECTION

Patent No. 3,664,061          Dated May 23, 1972

Inventor(s)    KARL O E P E N

It is certified that error appears in the above-identified patent and that said Letters Patent are hereby corrected as shown below:

In the title-page of the above-identified patent please change "Koln" to -- Cologne --, and correct the spelling of the street address from "Gladbscherstrasse" to -- Gladbacherstrasse --.

The fee for the corrections should be debited against undersigned counsel's deposit account No. 07-1400.

Signed and sealed this 5th day of December 1972.

(SEAL)
Attest:

EDWARD M. FLETCHER, JR.
Attesting Officer

ROBERT GOTTSCHALK
Commissioner of Patents